United States Patent
Kandari et al.

(10) Patent No.: US 11,436,404 B2
(45) Date of Patent: Sep. 6, 2022

(54) TECHNIQUES FOR AUTOMATED RESIZING OF TEXT CONTENT RESPONSIVE TO LAYOUT CHANGES

(71) Applicant: Adobe Inc., San Jose, CA (US)

(72) Inventors: Pragya Kandari, Srinagar Garhwal (IN); Sachin Singhal, Ghaziabad (IN); Gaurav Bhargava, Noida (IN); Ayushi Swaroop, Moradabad (IN); Anil Chopra, Noida (IN); Anasuiya Gupta, New Delhi (IN); Abhinav Agarwal, Noida (IN)

(73) Assignee: Adobe Inc., San Jose, CA (US)

( * ) Notice: Subject to any disclaimer, the term of this patent is extended or adjusted under 35 U.S.C. 154(b) by 42 days.

(21) Appl. No.: 16/560,052

(22) Filed: Sep. 4, 2019

(65) Prior Publication Data

US 2021/0064691 A1    Mar. 4, 2021

(51) Int. Cl.
*G06F 40/109* (2020.01)
*G06F 40/106* (2020.01)
*G06F 40/166* (2020.01)
*G06F 40/126* (2020.01)
*G06F 40/103* (2020.01)

(52) U.S. Cl.
CPC .......... *G06F 40/109* (2020.01); *G06F 40/103* (2020.01); *G06F 40/106* (2020.01); *G06F 40/126* (2020.01); *G06F 40/166* (2020.01)

(58) Field of Classification Search
CPC .... G06F 40/103; G06F 40/106; G06F 40/109; G06F 40/126; G06F 40/166
See application file for complete search history.

(56) References Cited

U.S. PATENT DOCUMENTS

| 5,754,873 | A  | * | 5/1998  | Nolan    | G06F 3/0481  |
|           |    |   |         |          | 715/235      |
| 6,256,650 | B1 | * | 7/2001  | Cedar    | G06F 40/10   |
|           |    |   |         |          | 715/273      |
| 6,300,947 | B1 | * | 10/2001 | Kanevsky | G06F 16/9577 |
|           |    |   |         |          | 715/866      |
| 6,456,305 | B1 | * | 9/2002  | Qureshi  | G06F 16/9577 |
|           |    |   |         |          | 715/800      |
| 6,556,217 | B1 | * | 4/2003  | Makipaa  | G06F 40/114  |
|           |    |   |         |          | 345/667      |
| 7,487,447 | B1 | * | 2/2009  | Jerger   | G06F 16/9577 |
|           |    |   |         |          | 715/252      |

(Continued)

*Primary Examiner* — Chau T Nguyen
(74) *Attorney, Agent, or Firm* — Kilpatrick Townsend & Stockton LLP

(57) ABSTRACT

A technique for automatically determining new font sizes includes receiving information indicating a layout change for a document. The document includes a text frame that includes text content in a first font size. The text content covers a particular percentage of the text frame, and the layout change causes a change in the size of the text frame to a resized text frame. The technique includes determining a second font size for the text content in the resized text frame. A percentage of the resized text frame covered by the text content in the second font size is substantially similar to the particular percentage of the document. The method includes resizing the size of the text content from the first font size to the second font size and outputting a document with the resized text frame with the text content in the second font size.

20 Claims, 11 Drawing Sheets

(56) References Cited

U.S. PATENT DOCUMENTS

| | | | |
|---|---|---|---|
| 7,584,423 B2* | 9/2009 | Rohrabaugh | G06F 40/143 |
| | | | 715/238 |
| 2005/0094207 A1* | 5/2005 | Lo | G06F 40/174 |
| | | | 358/1.18 |
| 2007/0124669 A1* | 5/2007 | Makela | G06F 16/9577 |
| | | | 715/201 |
| 2012/0110438 A1* | 5/2012 | Peraza | G06F 40/109 |
| | | | 715/243 |
| 2018/0074999 A1* | 3/2018 | Cogan | G06F 40/186 |
| 2020/0410686 A1* | 12/2020 | Zhang | G06T 11/60 |

* cited by examiner ent in the document and changing the font sizes of the text content to the new font sizes, while keeping the visual design of the document with the changed layout consistent with the visual design of the document before the layout change and also maintaining the readability and visual appeal of the text content in the document after the layout change.

TECHNIQUES FOR AUTOMATED RESIZING OF TEXT CONTENT RESPONSIVE TO LAYOUT CHANGES

TECHNICAL FIELD

This disclosure relates generally to tools for designing and editing layouts of documents. More specifically, techniques are disclosed for, in response to a change in the layout of a document, automatically determining new font sizes for text content in the document and changing the font sizes of the text content to the new font sizes, while keeping the visual design of the document with the changed layout consistent with the visual design of the document before the layout change and also maintaining the readability and visual appeal of the text content in the document after the layout change.

BACKGROUND

There are various situations where the same content has to be presented to consumers of the content using different layouts. For example, in multi-channel publishing, the same content is consumed using multiple devices such as tablets, mobile phones, desktop computers, etc. As another example, different layouts of different sizes may be required for different business purposes, for example, from small to very large sized posters. In such situations, even though the same content is being consumed across the different devices, a user or designer has to create different document layouts for outputting the same content differently to cater to the different screen sizes of the devices used by the consumers of the content. The designer also has to ensure that the visual design and readability of the content is consistent across the different document layouts. Creating these different layouts is a manual and tedious process for the designer.

SUMMARY

This disclosure relates generally to tools for designing and editing layouts of documents. More specifically, techniques are disclosed for, in response to a change in the layout of a document, automatically determining new font sizes for text content in the document and changing the font sizes of the text content to the new font sizes, while keeping the visual design of the document with the changed layout consistent with the visual design of the document before the layout change and also maintaining the readability and visual appeal of the text content in the document after the layout change.

In an example, a document editor receives information indicating a layout change for an original document. The original document includes a set of one or more text frames that include a first text frame including first text content in a first font size. The first text content covers a particular percentage of area of the original document, and the layout change causes a change in the size of the first text frame to a resized first text frame. The document editor determines a second font size for the first text content in the resized first text frame. A percentage of area of the resized first text frame covered by the first text content in the second font size is substantially similar to the particular percentage of area covered by the text content in the text frame in the original document prior to the layout change. The document editor resizes the size of the first text content from the first font size to the second font size. The document editor outputs, on a display, the document with the resized first text frame with the first text content in the second font size.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
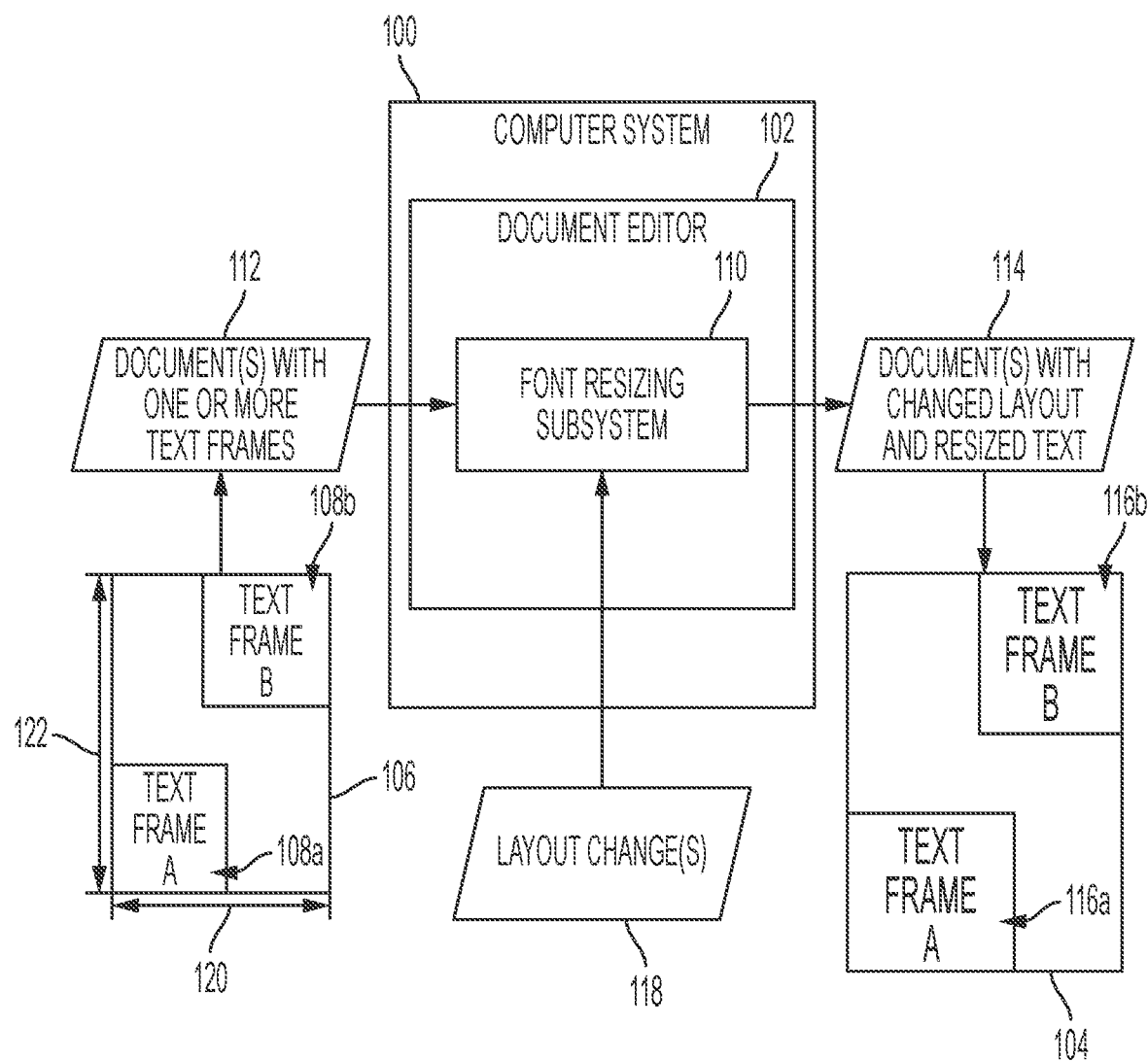
FIG. 1 depicts an example of a document editor in which a document and layout changes are used to generate a document with resized text, according to certain embodiments of the present disclosure.

In the following description, for the purposes of explanation, specific details are set forth to provide a thorough understanding of certain inventive embodiments. However, it will be apparent that various embodiments may be practiced without these specific details. The figures and description are not intended to be restrictive.

This disclosure relates generally to tools for designing and editing layouts of documents. In particular, techniques are described for, responsive to a change in the layout of a document, automatically determining new font sizes for and applying the new font sizes to the text content in the document with the changed layout, while keeping the visual design of the document with the changed layout consistent with the visual design of the document prior to the layout change and also maintaining readability and visual appeal of the text content in the document after the layout change.

The present disclosure addresses deficiencies of conventional systems with respect to determining font sizes for text content in a document when a layout of the document is changed. For example, as described in the Background section, there are several situations and use cases where the same content is presented using different layouts. Conventionally, in such situations, for each layout change, a designer has to manually select the size of the fonts to be used for presenting the text content for each layout. For each layout, the designer has to manually select one or more font sizes for displaying the text content such that the text is displayed with high legibility, clarity, and consistency. At the same time, the designer has to ensure that the visual design of how the text content is displayed in the various layouts is consistent across the various layouts. For each layout the designer tries out different font sizes before deciding upon particular one or more font sizes for a layout that meet the designer's expectations.

The placement of text content within a document is usually designed using one or more text frames or text boxes (referred to herein as text frames). A text frame provides a container for text content. As part of designing a layout for a document, a designer specifies various parameters related to each text frame in the document, such as: the dimensions or size of the text frame (e.g., width and height of the text frame for a rectangle-shaped text frame), where the text frame is to be located or placed within the document, the text content to be displayed or contained by the text frame, and how the text content is to be displayed within the text frame (e.g., specify the specific area within a text frame for displaying the text content for that text frame). Text frames thus provide the building blocks for designing the layout of text content within a document. A document, which can be a single page or multipage document, can contain one or more text frames of different sizes. The text content in a text frame in a document can be of the same font size or have different font sizes.

Typically, when different layouts have to be created, a designer designs a document with a first layout suitable for a first device type (e.g., for a tablet manufactured by Company A). The designer may then modify the layout of the first document to create a document with a second layout suitable for a second device type (e.g., for a mobile phone manufactured by Company A), and so on. In this manner, the designer may create documents with different layouts for different types of devices (e.g., different types of devices manufactured by different companies). Due to the layout changes, the sizes of the text frames in a document can be different for different layouts. For example, in a first layout, a text frame showing particular text content may have a first size (as defined by the dimensions of the text frame), but that same text frame showing the same particular text content may have a different size in a second different layout. Conventionally, a designer has to manually set the font sizes for each frame in each of the different document layouts.

A document in a particular layout can be a single or multi-paged document, even hundreds of pages long. Each document layout can include one or more text frames spread throughout the document. Each text frame can include text content with one or more font sizes. In such a scenario, the designer has to manually select a font size (or potentially multiple font sizes) for each text frame in each layout. This amounts to a lot of tedious and repetitive boring manual labor.

Existing tools aimed at assisting a designer with changing layouts of documents still require a significant amount of manual effort, especially when it comes to font sizes. For example, an outline creation tool enables a user to manually resize text in individual text boxes. This tool converts the characters in the text content to vector graphic representations or outlines, which the user can then manually resize. Resizing vector graphic representations of the text using the outline creation tool may resize in only an individual dimension (e.g., in an x-direction or a y-direction) resulting in font stretching or compression. Other tools involve resizing text (i.e., changing the font size used for displaying the text) on a single page layout without regard to a relationship of the text with the layout of the page.

The present disclosure describes techniques that automate the task of determining font sizes for text content when the layout of a document is changed. In certain embodiments, a document editor/designer tool (document editor) is provided that, in response to a change in the layout of a document including one or more text frames containing text content, automatically determines one or more new font sizes to be used for displaying the text contents in the one or more text frames in the changed layout. As described above, conventionally, finding suitable and appropriate font sizes for changed layouts was a manual process that was very time intensive, recursive, and redundant, leading to monotonous, tiresome, grunt work for the designer. This manual task is now automated by the document editor. The new font sizes are determined automatically by the document editor substantially free of any manual user input such as any manual input from the document designer. The new font sizes that are determined are such that the visual design of the changed layout is consistent with the visual design of the original layout and readability and visual appeal of the text content in the document with the changed layout is maintained. As a result of the solutions described in this disclosure, a document designer may not have to manually and painstakingly determine the font sizes to be used for each text frame for each changed layout. The teachings described in this disclosure thus enable quick and efficient design of different document layouts with resized text content to cater to different screen sizes of different devices (e.g., mobile phones, tablets, desktop computers, etc.). The monotonous, time intensive, recursive, tiresome, and redundant grunt work that a designer had to previously endure for creating different document layouts, and especially for selecting font sizes for the text content in the changed layout, may be eliminated.

In some embodiments, processing described herein for automatically determining new font sizes for text content for a changed layout and applying the new font sizes to the text content in the changed layout may be triggered responsive to a change in the layout for a document where the layout change causes the size of at least one text frame (where the size of a text frame is defined by the dimensions (e.g., width, height) of the text frame) in the document to change from the prior or original layout to the new changed layout. The layout associated with a document can be changed in various ways. As one example, the layout of a document may be changed when the size of the document, as defined by the dimensions of the document (e.g., width and height of the document), is changed. The size of a document may be changed as a result of changing the values of one or more dimensions (e.g., width, height) of the document. This change in the document layout may cause one or more text frames in the document to be resized and trigger the automated font resizing processing.

As another example, the layout of a document may be changed when one or more margins (e.g., top margin, bottom margin, left margin, right margin) of the document are changed (e.g., made smaller or larger). This change in the document layout may cause one or more text frames in the document to be resized, and trigger the automated font resizing processing.

As yet another example, the layout of a document may be changed when the arrangement of content (e.g., images, text content) within the document is changed. For example, the arrangement may be changed by changing the placement of frames (e.g., text frames) within the document, by changing the size (e.g., dimensions) of one or more of the frames, by inserting new content into the document, by deleting existing content from the document, and the like.

In certain embodiments, the user, for example, the designer, can control whether the automated font resizing processing is to be enabled or disabled. For example, the document editor provides a user-selectable option or preference for enabling (or disabling) the automated font resizing functionality. For example, a user selectable "Adjust Font Size" option (e.g., a check box) may be provided via a graphical user interface (GUI) of the document editor. When this has been selected, the automated font resizing processing may be automatically triggered when at least one text frame in a document is resized (i.e., a value associated with at least one dimension of the text frame is changed) as a result of a change in the layout of the document.

A document can contain one or more text frames, each text frame containing text in one or more font sizes prior to the layout change. The font sizes in the document prior to the layout change are referred to as the original font sizes. As part of the automated font resizing processing, for each original font size in the document, a font resizing factor is determined by the document editor. The font resizing factor calculated for an original font size is then used to calculate the corresponding new font size for the original font size for text content in the changed layout. For example, the new font size is calculated by multiplying the original font size with the font rescaling factor calculated for that original font size. The font resizing factors are determined in a way that attempts to keep the visual design of the changed layout document consistent with the visual design of the document before the layout change, while maintaining the readability and visual appeal of the text content in the changed layout. In certain embodiments, this is achieved using different rules that guide the automated font resizing processing. These rules include:

(1) For a text frame in a document that contained text content of an original font size prior to the layout change, the new font size determined for that original font size is such that the percentage of the text frame occupied by the text content displayed in the text frame after the layout change using the new font size is the same as the percentage of the text frame occupied by the text content displayed in the text frame before the layout change using the original font size. For example, if the text content displayed in a text frame using the original font size occupied 20% of the text frame before the layout change, the new font size for the text content is determined such that the text content when displayed in the resized text frame after the layout change using the new font size occupies approximately 20% of the resized text frame. Further, a location of the text in a text frame in the document before the layout change (e.g., bottom of the frame, top of the frame, middle of the frame, etc.) is generally maintained in the resized text frame after the layout change.

(2) The new font sizes are determined such that the total number of different font sizes used in the document after the layout change and after the automated font resizing is the same as the total number of font sizes in the document prior to the layout change. For example, if there were ten different font sizes used for displaying text content in the document before the layout change, then there are also ten new font sizes used for displaying the text content in the document after the layout change and after the font resizing.

(3) All instances of text content in a document having the same original font size prior to the layout change are resized to a same changed new font size after the font resizing. For example, assuming that a 12 point font size prior to the font resizing is changed to a new 14 point font size as a result of the automated font resizing, then all instances in the document containing text content with original 12 point font size prior to the font resizing are all changed to 14 point font size after the automated font resizing. The instances may be in the same frame or across different frames in the document. This may be the case even if the text content is in a frame on the pasteboard (a term used for a digital work area that is not part of any page of a document where content, including text content, can be placed and later copied to a page of the document), is in the overset (overset text is text that is associated with a text frame but is not displayed by the text frame because the text frame is not large enough to show the text), or even is on an overridden page (term used for a page of the document with a format that does not align with a remainder of the pages in the document).

(4) The text content displayed in the text frames in the document after the layout change and the automated font resizing processing is the same as the text content displayed by the text frames prior to the layout change.

In certain embodiments, all of the four rules may be used in combination to guide the automated font resizing processing. In other embodiments, different combinations of the rules, where a combination may not include one or more of the rules, may be used to guide the automated font resizing processing In certain embodiments, all the text frames in the document that contain text content having the same original font size prior to the resizing operation are identified and linked together as a group. In one embodiment, a linked graph of nodes is created for each original font size in the document. The graph for a particular original font size includes nodes representing text frames that contain text content of the particular original font size prior to the resizing. The text frames linked together in the graph may be on the same page or on different pages of the document. For text frames linked together in a graph for a particular original font size, a font resizing factor is calculated for each text frame. The graph is then traversed to find the lowest font resizing factor from the font resizing factors calculated for the text frames in the graph. The lowest determined font resizing factor is then identified as the font resizing factor for resizing that particular original font size. The lowest determined font resizing factor is then associated with each text frame in the graph and used for resizing the text content of the particular original font size contained in the text frame. This processing ensures that both rules (2) and (3) are followed by the automated font resizing processing.

As part of the automated font resizing processing, readability of the text content in the changed layout is also considered, especially, parameters or preferences that a designer may have configured with respect to readability. For example, in certain embodiments, a designer can explicitly impose limits on the font sizes that are computed and used by the automated font resizing processing for the new changed layout. For example, the designer can set a minimum font size limit and/or a maximum font size limit for a document or for a particular layout. When the minimum font size is set to a particular minimum value, it controls the smallest font size that can be used in that document for a layout. Accordingly, if the automated font resizing processing determines a new changed font size value that is smaller than the certain value, instead of using the new changed font size value for resizing the font, the particular minimum value is used instead for the resizing. The minimum font size limit parameter thus puts a floor on the smallest new font size value that can be used in the document. In a similar manner, the maximum font size limit parameter may be used by the designer to put a ceiling on the maximum new font size value that can be used in the document for a layout. Accordingly, if the automated font resizing processing determines a new changed font size value that is higher than the value set for the maximum font size value limit, instead of using the new changed font size value for resizing the text content, the particular minimum value set for the maximum font size value limit is used instead for the resizing.

In certain embodiments, as part of the automated font resizing processing, a font resizing factor is computed for each original font size in the document before the layout change. The font resizing factor determined for a particular original font size is then associated with each text frame containing text content in the particular original font size before the layout change. The font resizing factor associated with a text frame is then used to determine a new font size for resizing the text content in in the particular original font size in that text frame. A new changed font size to be used for the resized text frame may be determined by applying the font resizing factor to the original font size associated with that text frame prior to the resizing operation. For example, the new font size is calculated by multiplying the original font size with the font rescaling factor calculated for that original font size. The text content in the resized text frame is then changed to the new changed font size. The document may then be output in the new layout showing the resized fonts. In some embodiments, the font resizing may be performed for each text frame in the document.

The following non-limiting example is provided to introduce certain features. In this example, a document editor is provided that is capable of, responsive to changes made to a layout of an original document (or multiple original documents) with one or more text frames containing text content, automatically determining new font sizes for displaying the text content in the changed layout and applying the new font sizes to the text content. The document editor executes one or more algorithms that enable the automated font resizing processing. The automated font resizing processing is guided by certain rules that seek to keep the visual design of the changed layout consistent with the visual design of the original document while maintaining the readability and visual appeal of the text content in the changed layout.

The original document may have an associated layout design and contain one or more pages. The one or more pages of the original document may contain various types of content, including text content and possibly other types of content such as images, etc. The text content may be distributed across one or more text frames spread across the pages of the document. A user or designer may wish to generate additional document layouts for various devices based upon the original document. Each document layout may include the same content as in the original document, including text content, but have a different associated layout. For example, the user may want to change the layout of the original document to different layouts for presenting on varying sizes of displays while maintaining the same general layout and readability. For example, the original document may include content and a layout that the user found particularly appealing, and the user desires to capture the content and layout in other document layouts that are resized for use with other delivery formats (e.g., on smaller or larger screen sizes).

Continuing with this example, the user may also have enabled the "Adjust Font Size" option for the document editor. The user may open the original document using the document editor and then change the layout of the document to a new layout. As a result of the new layout, one or more text frames in the document may be resized, which triggers the automated font resizing processing performed by the document editor. As part of this processing, the document editor determines a font resizing factor for each font size (referred to as original font size) occurring in the original document before the layout change and then computes a corresponding new font size for each original font size. As part of this processing, the document editor computes a font resizing factor for each original font size. The font resizing factor computed for an original font size is then used to compute the new font size for that original font size. For example, in some embodiments: New Font Size=Original Font Size*Font resizing factor. The computation of the font resizing factors and the new font sizes is guided by one or more rules. Other factors may also influence the new font sizes, such as minimum and maximum font limits specified for a document or for a layout. For a particular original font size, the document editor changes the text content in the document in the original font size before the layout change to text content in the new font size in the change layout.

As described herein, certain embodiments provide improvements to document editors by solving problems associated with document editing and generation. The automated font resizing processing performed by the document editor dramatically simplifies the task of generating documents with different layouts since the task of determining new font sizes for text content in the changed layouts is not automated by the document editor. This particularly difficult task would otherwise have to be performed manually by a user or designed using some document editor. Generating a document with resized text from an original document provides a user with the ability to leverage existing design elements of the original document when generating the documents with resized text for display on a variety of different sized displays. Referring now to the drawings, FIG. 1 is an example of a computing environment including a computer system 100 executing a document editor 102 with the capability to perform automated font resizing processing according to certain embodiments. The document editor 102 can be implemented only in software (e.g., via code, instructions, programs executed by one or more processors of computer system 100). In an example, document editor 102 may include or be a part of document editors such as Adobe InDesign® or any other document editor. The computing environment depicted in FIG. 1 is merely an example and is not intended to unduly limit the scope of claimed embodiments. One of ordinary skill in the art would recognize many possible variations, alternatives, and modifications. For example, in some implementations, the document editor 102 can be implemented using more or fewer subsystems than those shown in FIG. 1, may combine two or more subsystems, or may have a different configuration or arrangement of subsystems.

A user may use document editor 110 to open an original document 112. The original document 112 may be a single or multi-paged document. The original document 112 may have a particular layout (referred to as the original layout). Per the layout, the text content in original document 112 may be spread across one or more text frames. The text frames may be spread across one or more pages of original document 112. A text frame provides a container for text content in the document. The original layout of original document 112 defines, for each text frame: the dimensions or size of the text frame (e.g., width and height of the text frame for a rectangle-shaped text frame); where the text frame is to be located or placed within original document 112; the text content that is displayed or contained by the text frame; and how the text content is to be displayed within the text frame (e.g., specify the specific area within a text frame for displaying the text content for that text frame).

FIG. 1 depicts an example page 106 from the original document 112. As shown, the example page 106 has a width 120 and a height 122 and includes text frames 108a and 108b. Each of the text frames 108a and 108b has a certain size, as defined by the dimensions (e.g., the width 120 and the height 122) of the text frame. Generally, a page of the original document 112 may include one or more text frames positioned at different locations of the page. In this manner, one or more text frames may spread out across the original document 112. The text content may be displayed within each text frame. Each text frame is a container and provides boundaries within which the text associated with that text frame is displayed. While the text frames 108a and 108b depicted in FIG. 1 include outlines for clarity, the text frames 108a and 108b may also include transparent boundaries in which text of the text frames 108a and 108b is constrained.

A text frame in the original document 112, such as the text frame 108a or 108b, may include text of one font size or multiple font sizes. For example, text frame 108a may include text content of a single font size (e.g., 12 point font size) while in text frame 108b, part of the text content may be a 12 point font size and a second part may be a 14 point font size.

The original document 112 may have been created by the user for display on a particular type of device (e.g., a mobile phone, a tablet, etc.) by a particular manufacturer. The original document 112 may be selected by the user based on the user's desire to change the original layout of the document for display on a device with a different display (e.g., for display on a different type of device by the same or different manufacturer). The user may use the document editor 102 to make layout changes to the original document 112. The layout changes may cause the sizes of one or more text frames in the original layout to change under the new layout. Responsive to the layout changes, document editor 102 is configured to perform automated font resizing processing to automatically determine new font sizes for text content in original document 112 and changing the font sizes of the text content to the new font sizes in the changed layout, while keeping the visual design of the with the changed layout consistent with the visual design of the document before the layout change and while also maintaining the readability and visual appeal of the text content in the document after the layout change.

In the embodiment depicted in FIG. 1, the document editor 102 includes a font resizing subsystem 110 that is responsible for performing the automated font resizing processing. The font resizing subsystem 110 may be implemented using software (e.g., code, instructions, programs) executed by one or more processing units (e.g., processors, cores), hardware, or combinations thereof. The software may be stored on a non-transitory storage medium (e.g., on a memory device).

The font resizing subsystem 110 receives the original documents 112 with one or more text frames at block 112 and outputs a document 114 with a changed layout and automatically resized text content. In the embodiment depicted in FIG. 1, the font resizing subsystem 110 receives the original document 112 and one or more layout changes 118 that are made to the layout of the original document 112. The layout changes cause one or more text frames in the original document 112 to change in size (e.g., at least one dimension of a text frame changes). For example, as depicted in FIG. 1, as a result of the layout change, page 106 has changed in size (both the width and height of the page have changed) and as a result the sizes of the text frame 108a and 108b have been resized: text frame 108a has been resized (due to increases in width and height) to text frame 116b in page 104, and text frame 108b has been resized (again due to increases in width and height) to text frame 116b in the page 104.

Different kinds of layout changes may be made that cause the sizes of the text frames to change. For example, the layout changes 118 may include a change to the size of the document, as defined by the dimensions of the document (e.g., width height of the document). This may happen due to an adjustment of a height and width of the original document 112, an adjustment of an orientation (e.g., transitioning from portrait orientation to landscape orientation) of the original document 112, and the like. For example, if the original document 112 were a single page document containing page 106, the size of the original document 112 has been increased in FIG. 1. As another example, the layout of a document may be changed when one or more margins (e.g., top margin, bottom margin, left margin, right margin) of the document are changed (e.g., made smaller or larger). As yet another example, the layout of the original document 112 may be changed when the arrangement of content (e.g., images, text content) within the document is changed. For example, the arrangement may be changed by changing the placement of frames (e.g., text frames) within the document, by changing the size (e.g., dimensions) of one or more of the frames, by inserting new content into the document, by deleting existing content from the document, and the like.

The user may provide an indication of the layout changes 118 manually through a user interface, such as via a GUI of the document editor 102. For example, the user may interact with the original layout of the original document 112 and make changes to the layout. In some embodiments, the layout changes 118 may be automatically generated based on a size of a display to which the document 114 with the new layout will be displayed (e.g., in a fit to screen context with a change in the aspect ratio of a new display). In an example, the document 114 with the new layout is displayable on a digital medium, such as a computer, a tablet, a video screen, etc., and the document 114 with the new layout is also capable of being printed and displayed within a form of print media.

In one example, the font resizing subsystem 110 receives an individual original document 112 and, responsive to layout changes to the original document 112, automatically determines new font sizes for the text content for the new layout and generates a document with resized text. In another example, the font resizing subsystem 110 may receive multiple original documents 112 and layout changes to the multiple documents and, in response, automatically determines new font sizes for the text content for each of the new layouts and generate multiple documents with resized text. Processing performed by the font resizing subsystem 110 is described below.

The new font sizes determined by the font resizing subsystem 110 are such that the visual design of the document with the changed layout is consistent with the visual design of the document before the layout change. Additionally, the readability and visual appeal of the text content in the document after the layout change is maintained. This is achieved by the font resizing subsystem 110 by following certain rules as part of the automated font resizing processing. In certain embodiments, all of the four rules are used in combination to guide the automated font resizing processing. In other embodiments, different combinations of the rules, where a combination may not include one or more of the rules, may be used to guide the automated font resizing processing. These rules include:

(1) For a text frame in a document that contained text content of an original font size prior to the layout change, the new font size determined for that original font size is such that the percentage of the text frame occupied by the text content displayed in the text frame after the layout change using the new font size is the same as the percentage of the text frame occupied by the text content displayed in the text frame before the layout change using the original font size. In one embodiment, for a text frame, the number of lines in the text frame comprising the text content are determined. The size of each line (e.g., height and width) coupled with the number of lines is then used to determine what percentage of the text frame is occupied by the lines. The new font size is then determined such that this percentage is preserved when the text content with the new font size is displayed in the resized text frame after the layout change.

(2) The new font sizes are determined such that the total number of different font sizes used in the document after the layout change and after the automated font resizing is the same as the total number of font sizes in the document prior to the layout change.

(3) All instances of text content in a document having the same original font size prior to the layout change are resized to same changed new font size after the font resizing. The instances may be in the same frame or across different frames in the document.

(4) The text content displayed in the text frames in the document after the layout change and the automated font resizing processing is same as the text content displayed by the text frames prior to the layout change.

Figure 2:
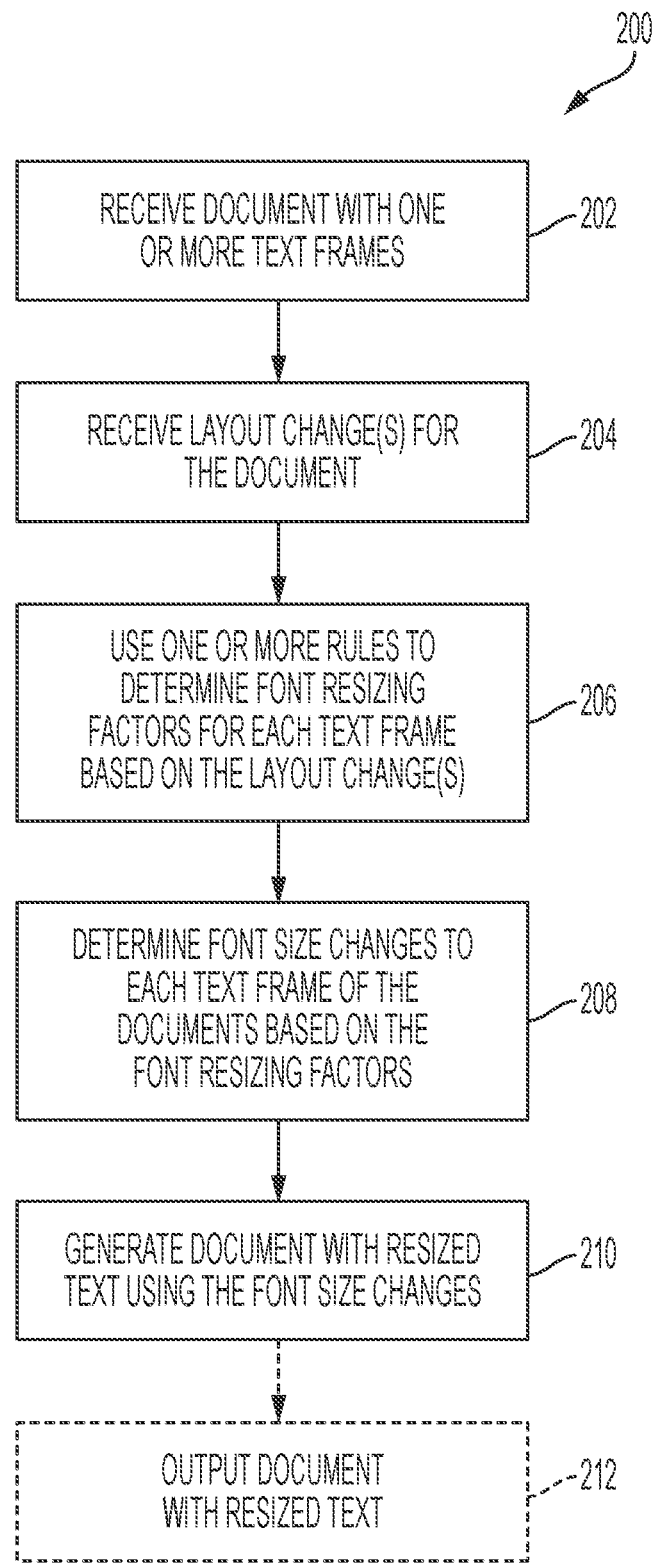
FIG. 2 depicts an example of a process for generating the document with resized text using the document editor of FIG. 1, according to certain embodiments of the present disclosure.

The operations performed by the document editor 102 in certain embodiments are described with reference to FIG. 2. FIG. 2 depicts an example of a process 200 for performing automated font resizing processing according to certain embodiments. One or more computing devices implement operations depicted in FIG. 2 by executing suitable program code. For illustrative purposes, the process 200 is described with reference to certain examples depicted in the figures. Other implementations, however, are possible.

The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in blocks 202-212 in FIG. 2 is performed by the font resizing subsystem 110 depicted in FIG. 1 or other aspects of the document editor 102.

At block 202, the process 200 involves receiving an original document 112 with one or more text frames 108 at the document editor 102. For instance, a user may provide the original document 112 to the document editor 102. The user may identify a filename for the original document 112, and the document editor 102 accesses the identified document from a memory location where the original document 112 is stored. The original document 112 may have a particular original layout that defines the size of the document, the margins of the document, and the placement of content within the document (including text frames containing text content), and the like. At block 202, a single original document 112 may be received or multiple original documents 112 may be received. For purposes of simplicity, the processing described below assumes that a single original document is received. This is however not intended to be limiting. The process 200 may be performed on multiple original documents received in series or in parallel.

At block 204, the process 200 involves receiving layout changes 118 for the original document 112. The layout changes change the original layout of the original document 112 to a new changed layout. The layout changes 118 may include an adjustment of margin sizes, an adjustment of a height and width of a document, an adjustment of an orientation (e.g., transitioning from portrait orientation to landscape orientation) of a document, adjustments of locations of the text frames 108, any other layout changes, or any combination thereof. A user may provide an indication of the layout changes 118 manually through a user interface, or the layout changes 118 may be automatically generated based on a size of a display to which the document 114 with the new layout will be displayed.

At block 206, the process 200 involves using one or more rules to determine font resizing factors for each original font size of the text in the text frames 108 of the original document 112 based on the layout changes 118. Four rules that govern the font resizing processing are described above with respect to FIG. 1. In certain embodiments, all of the four rules are used in combination to guide the automated font resizing processing. In another embodiment, different combinations of the rules, where a combination may not include one or more of the rules, may be used to guide the automated font resizing processing. Further, a location of the text frames 108 from the original document 112 (e.g., bottom of the frame, top of the frame, middle of the frame, etc.) is generally maintained by the resized text frames 116 of the document 114 with the new layout.

At block 208, the process 200 involves determining font size changes to be applied to the text context of each of the text frames 108 of the original document 112 based on the font resizing factors computed in block 206. In one embodiment, for a text frame containing text content with an original font size of "FS_Original" before the layout change, the new font size to be used for displaying that text content in the resized text frame after the layout change is given by: FS_New=FS_Original*FontScalingFactor, where FS_New is the new font size to be used and FontScalingFactor is the font resizing factor determined for FS_Original.

It is possible that, prior to the layout change, a text frame had text content in multiple original font sizes. In such a scenario, a new font size is determined for each of the different original font sizes using the font resizing factor associated with the text frame. For example, if a text frame includes font sizes of 12 point and 16 point, a font resizing factor is computed for the text frame. In a text frame 108 with text that has multiple font sizes, the relationship between the font sizes within the text frame 108 is maintained by multiplying the multiple font sizes by the font resizing factor of the text frame 108.

At block 210, the process 200 involves generating the document 114 with the new layout using the font size changes in the resized text frames 116. The document 114 with the new layout is generated to correspond with the layout changes 118 received by the font resizing subsystem 110. The text of the resized text frames 116 also covers a same percentage of the resized text frames 116 as the percentage of the text frames 108 covered by the text in the original document 112. In other examples, the text of the resized text frames 116 covers a substantially similar percentage of the resized text frames 116 as the percentage of the text frames 108 covered by the text in the original document 112. As used herein, the term "substantially similar" may mean that a value falls within ten percent of another value. Further, the term "same" may mean that a value falls within 5 percent of another value. Further, the text of the resized text frames 116 retains a "live font" status after being resized. The term "live font" may refer to the text retaining all of its font characteristics, such as the ability to change the font size, font style, font color, kerning, etc.

In some embodiments, the resized text frames 116 are positioned in locations of the document 114 with the new layout that are similar to locations of the text frames 108 in the original document 112. An original text frame 108 and a resized text frame 116 could be in similar locations if a position of the original text frame 108 relative to edges of the original document 112 is proportionate to a position of the resized text frame 116 relative to edges of the document 114 with the new layout. As a simplified example, a text frame 108 in the original document 112 could be positioned such that the top right corner is at coordinates (x, y). If the resized text document 104 has doubled the width of the original document 112 and doubled the height of the original document 112, then the top right corner of the resized text frame 116 could be positioned at coordinates (2x, 2y). In other examples, the resized text frame 116 can be located in an area of the document 114 with the new layout that is not substantially similar to the location of the original text frame 108 in the original document 112.

At block 212, the process 200 may involve outputting the document 114 with the new layout to a display. In some examples, the document 114 with the new layout is output with a layout (e.g., document size) that matches a display size of the display. For example, a layout of the document 114 with the new layout is altered based on the size of the display that is being used to display the document 114 with the new layout. In another example, the process 200 may involve printing the document 114 with the new layout on a print medium with a size that matches the layout of the document 114 with the new layout.

Figure 3:
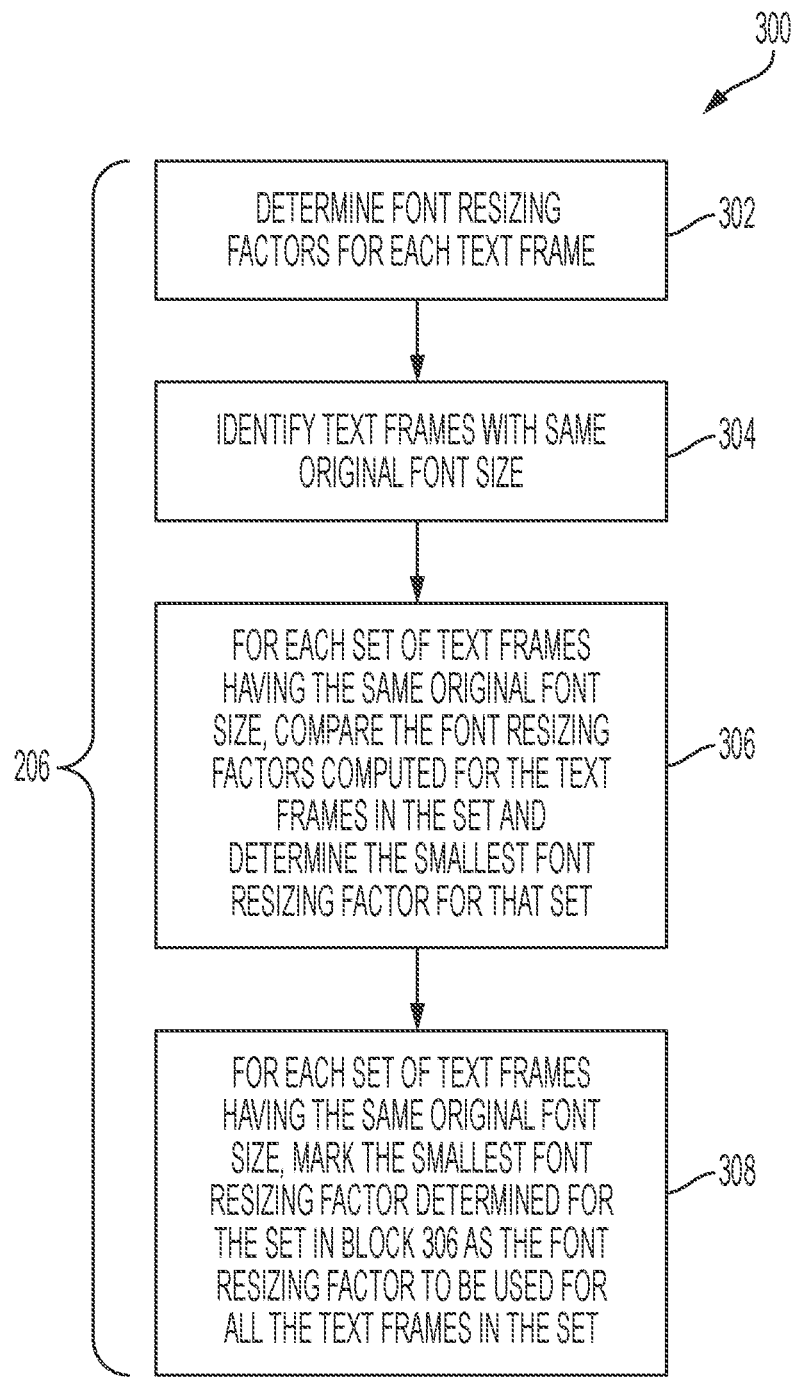
FIG. 3 depicts an example of a process for maintaining font size similarities in the document with resized text using the document editor of FIG. 1, according to certain embodiments of the present disclosure.

FIG. 3 depicts an example of a process 300 for maintaining font size similarities in the document 114 with the new layout using the document editor 102, according to certain embodiments. One or more computing devices (e.g., the computer system 100) implement operations depicted in FIG. 3 by executing suitable program code. For illustrative purposes, the process 300 is described with reference to certain examples depicted in the figures. Other implementations, however, are possible.

The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in blocks 302-308 in FIG. 3 is performed by the font resizing subsystem 110 depicted in FIG. 1 or other aspects of the document editor 102. Further, the blocks 302-308 may be used in the process 200 by replacing or otherwise supplementing block 206 of the process 200 with the blocks 302-308.

At block 302, the process 300 involves determining a font resizing factor for each original font size in each text frame 108 of the original document 112. For instance, as described above with respect to block 206, the font resizing factors for the original font sizes in the text frames 108 of the original document 112 are determined using one or more rules based on the layout changes 118.

In an example, the font resizing factors may be determined using a binary search algorithm with two steps. The first step of the binary search algorithm includes calculating the font resizing factor for each of the text frames 108 using the following equation (in one embodiment, the font resizing factor is calculated to three decimal places):

$$nH = \Sigma nL * nAH \qquad \text{(Equation 1).}$$

In Equation 1, the term nH is the known new height of the resized text frame that has been resized as a result of the changed layout. The term nL is an unknown and represents a new number of lines in each paragraph in the resized text frame. The term nAH is an unknown and represents a new average line height of the lines in the resized text frame 116.

These unknown values of Equation 1 can all be derived from the new layout associated with the document. For example, the new number of lines and the average line height may have a number of solutions that result in the same known new height of the resized text frame 116. The term nH in Equation 1 can be rewritten as the following equation:

$$nH = \quad \text{(Equation 2)}$$

$$oH * vScale = oAH * nfontSize \sum_{para=0}^{nPara} \text{ceil}\left(\frac{oL * nfontSize}{hScale}\right).$$

The following table provides a description of the terms within Equation 2:

TABLE 1

| Equation Term | Description |
| --- | --- |
| oH | Known original height of the text frame 108 from the original document 112. |
| vScale | Equal to a new height of a resized text frame 116 divided by an original height of the text frame 108 of the original document 112. |
| oAH | Known original average height of text lines in the text frame 108. oAH is equal to a height of the text frame 108 divided by a number of text lines in the text frame 108. |
| nfontSize | A font resizing factor that is a ratio of an unknown new font size of the resized text frame 116 and a known original font size of the text frame 108. |
| oL | Known original number of text lines of the text frame 108 of the original document 112. |
| hScale | Known horizontal scale from the text frame 108 to the resized text frame 116. hScale is equal to a new width of the text frame 116 in the document 114 divided by an original width of the text frame 108 in the original document 112. |

Using Equation 2, the new height nH is calculated by multiplying the known original height oH of the text frame 108 by the vertical scale vScale.

The values for each of the known "original" terms provided in Equation 2 are known from layout characteristics of the original document 112. Further, the values of the known "new" terms provided in Equations 1 and 2 are known from layout characteristics of the document 114 with the new layout. In an example, the values of the known "new" terms may also be known from a scaling value associated with layout characteristic changes from the original document 112 to the document 114 with the resized text. For example, if the original document 112 is doubled in sized to create the document 114 with the new layout. In such an example, the text frames 116 are similarly doubled in size from the text frames 108.

Solving Equation 2 for the nfontSize value (i.e., the font resizing factor) provides a multiplier that can be applied to the original font size (e.g., from the text frame 108) to determine a new font size value for the resized text frame 116. For example, if determining from Equation 2 that the font resizing factor is 2, text with an original 12 point font size in the text frame 108 will have a new 24 point font size in the resized text frame 116. If the font resizing factor generates a new font size in the resized text frame 116 with an incompatible number of decimal places, the new font size may be rounded to the closest compatible decimal place for the resized text frame 116. For example, a 12.630 point new font size may be rounded to a 12.5 point font size.

The font resizing factor is determined for each of the text frames 108 in the original document 112. In a second step of the binary search algorithm, a singular font resizing factor is selected for each of the text frames 108 that have the same font size in the original document 112. This second step ensures that a set of the resized text frames 116, which is generated from a set of the text frames 108 with text of the same font size, will include the same font size in the document 114 with the new layout. To accomplish this, the font resizing factors for each of the text frames 108 with text of the same size in the original document 112 are compared, and the smallest font resizing factor for the set of text frames 108 with the same font size in the original document 112 is selected.

At block 304, the process 300 involves identifying the text frames 108 in the original document 112 that include the same font sizes. Because the font resizing factors 108 may vary for each text frame 108 of the original document 112, the document editor 102 identifies text frames 108 with text that should be the same size in the resized text frames 116 of the document 114 with the new layout. The font adjustment system 110 can implement block 304 by identifying font sizes in various text frames and assigning different text frames with the same font size to the same group. In a simplified example, the font adjustment system 110 could determine that, in an original document 112 with eight text frames 108, two of the text frames 108 have a 12 point font size, two of the text frames 108 have a 14 point font size, and the other four text frames 108 have a 16 point font size. In this example, the font adjustment system 110 assigns the two text frames having a 12 point font size to a first group, assigns the two text frames having a 14 point font size to a second group, and assigns the four text frames having a 16 point font size to a third group.

At block 306, the process 300 involves comparing the font resizing factors for each of the text frames 108 identified at block 304 with the same font sizes and determining the smallest font resizing factor for the text content in the set of text frames 108 with the same font sizes identified at block 304. Comparing the font resizing factors may be performed by building a graph where unique identifications of the font resizing factors of the identified text frames 108 are vertices, and an edge is created between vertices of the unique identifications. Using a depth first search on the vertices, the font adjustment system 110 determines a smallest font resizing factor among the identified text frames 108 with the same font size.

At block 308, the process 300 involves marking the smallest font resizing factor determined at block 306 as the font resizing factor to be used for all of the text frames 108 with the same font size identified at block 304. In this manner, the resized text frames 116 of the document 114 with the new layout that correspond to the text frames 108 identified at block 304 will also have the same font sizes. Applying the smallest font resizing factor to the text of the same size in the original document 112 when generating the document 114 with the new layout ensures that there is no overset for the resized text frames 116 in the document 114 with the new layout.

In another example, the font adjustment system 110 could assign at least one weight to each of the text frames 108 of the original document 112. A given weight for a given text frame 108 indicates a content area percentage of the original document 112 covered by the given text frame 108. These weights may be used to determine which of the resized text frames 116 should have the same font resizing factor in the document 114 with the new layout, as opposed to applying common font resizing factors to the text frames 108 that include the same font sizes. In a simplified example, the font adjustment system 110 could determine that, in an original document 112 with four text frames 108, two of the text frames 108 cover an area of two square inches in the original document 112, and the other two text frames 108 cover an area of four square inches in the original document. In this example, the font adjustment system 110 assigns the two text frames having a two square inch area a first font resizing factor, and the font adjustment system 110 assigns the two text frames having a four square inch area a second font resizing factor.

Figure 4:
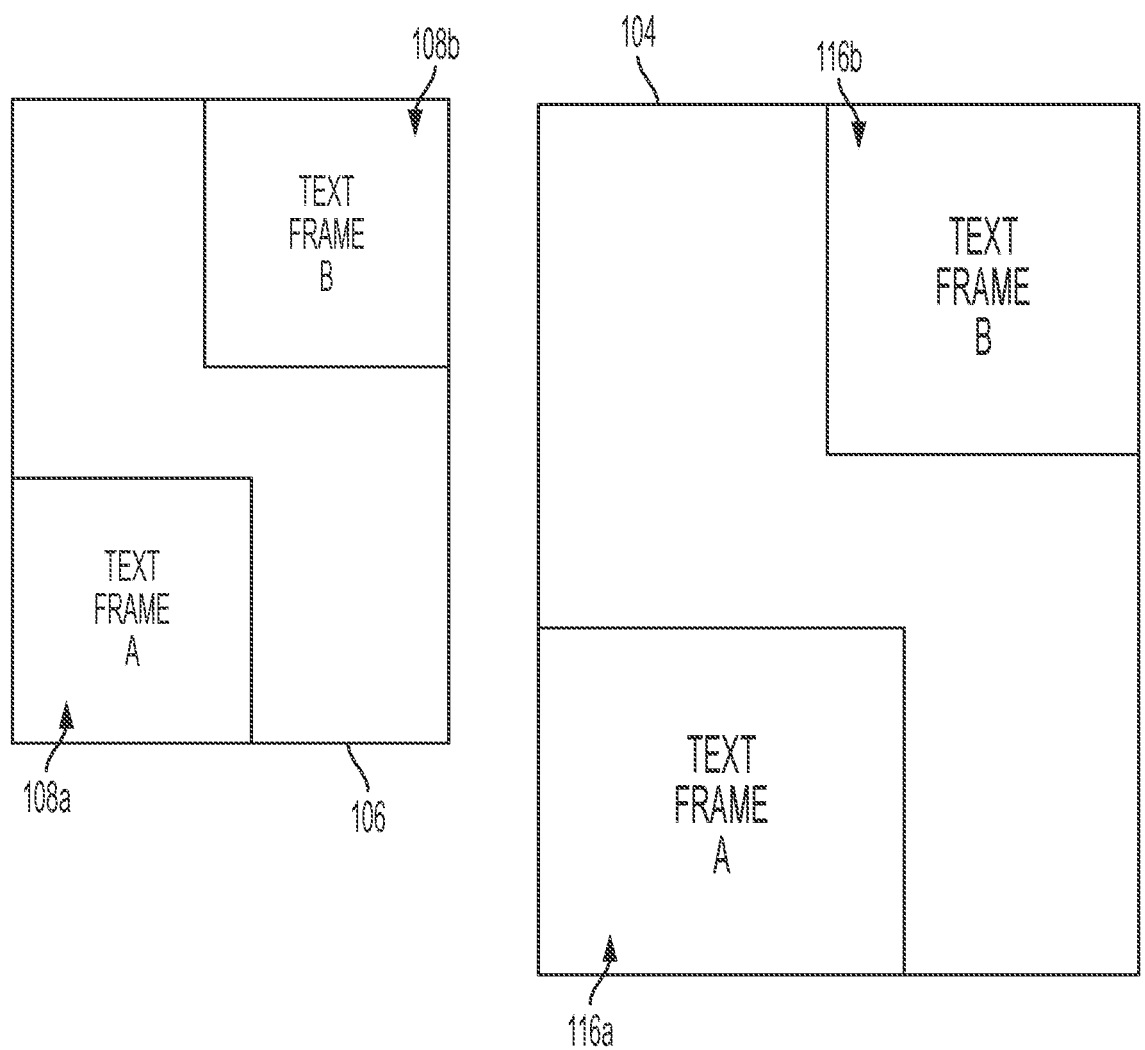
FIG. 4 depicts an example of a visual representation of a document with multiple text frames and a document with resized text generated by the document editor of FIG. 1 from the document with multiple text frames, according to certain embodiments of the present disclosure.

FIG. 4 depicts an example of a visual representation of the original document 112 with the text frames 108a and 108b and the document 114 with the new layout generated by the document editor 102 from the original document 112, according to certain embodiments. In the illustrated example, the text frames 108a and 108b each include text with the same font size. Accordingly, as discussed above with respect to FIG. 3, the resized text frames 116a and 116b of the document 114 with the new layout also include text with the same size. For example, the font resizing factor for the resized text frames 116a and 116b is the same, resulting in the same font size of the text in both of the resized text frames 116a and 116b of the document 114 with the new layout. In this example, the font resizing factor ensures that, if the original document 112 having the text frames 108a and 108b at an original size is changed into the document 114 with the new layout with the resized text frame 116a and 116b, a percentage of the text frames 108a and 108b covered by text at the original size is the same as a percentage of the text frames 116a and 116b covered by resized text.

FIG. 4 illustrates a layout change 118 that increases the size of the original document 112 to generate the document 114 with the new layout. But other implementations are possible. As one example, similar processing is performed if the original document 112 is decreased in size. As another example, similar processing is performed if a value of only a single dimension of the original document is changed (e.g., only a height of the original document 112 is changed while the width is kept the same, or only the width of the original document 112 is changed while the height is kept the same). As another example, similar processing is performed if margins of the original document 112 are changed. For instance, the resized text in the resized text frames 116 may be generated as if the size of the original document 112 decreases when the margin sizes increase, or the resized text frames 116 may be generated as if the size of the original document 112 increases when the margin sizes decrease.

Figure 5:
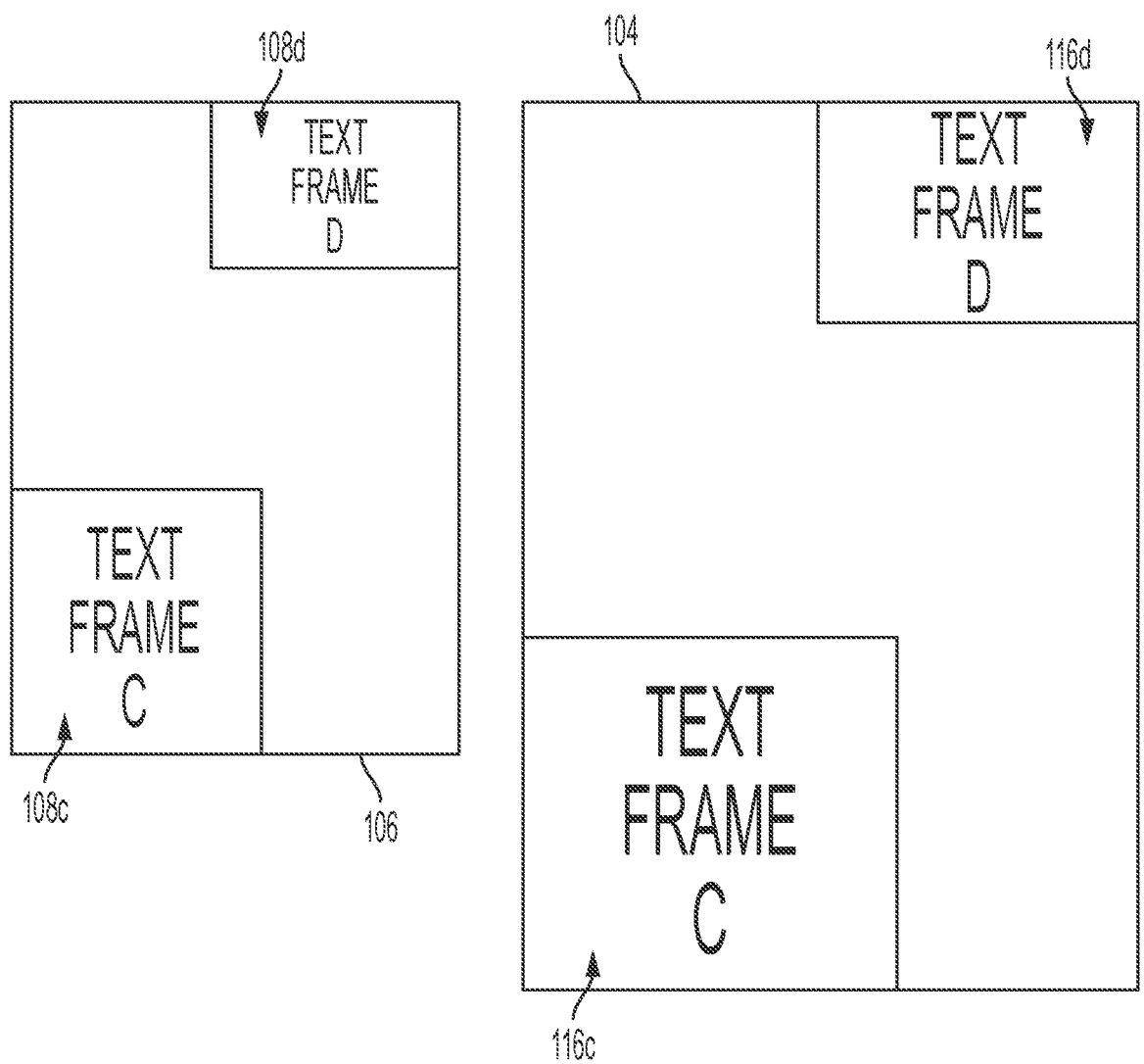
FIG. 5 depicts an additional example of a visual representation of a document with multiple text frames and a document with resized text generated by the document editor of FIG. 1 from the document with multiple text frames, according to certain embodiments of the present disclosure.

FIG. 5 depicts an additional example of a visual representation of the original document 112 with multiple text frames 108c and 108d and a document 114 with the new layout generated by the document editor 102 from the original document 112, according to certain embodiments. In the illustrated example, the text frame 108c includes text with a first font size, and the text frame 108d includes text with a second font size different from the first font size. For example, the font size of the text in the text frame 108c is larger than the font size of the text in the text frame 108d. Accordingly, in the document 114 with the new layout, the resized text frame 116c includes text that has been resized using a first font resizing factor, and the text frame 116d has been resized using a second font resizing factor. In this example, the first font resizing factor differ from the second font resizing factor due to the one or more of the four rules identified above with respect to block 206 of FIG. 2.

For example, the font resizing factor for the resized text frame 116c may be slightly larger than the font resizing factor for the resized text frame 116d. The text in the resized text frame 116c includes a different font size than the text in the resized text frame 116d. Further, the text in the resized text frame 116c covers the same percentage of the text frame 116c as the text in the text frame 108c covers in the resized text frame 108c. Additionally, the text in the resized text frame 116d covers the same percentage of the resized text frame 116d as the text in the text frame 108d covers in the text frame 108d.

Figure 6:
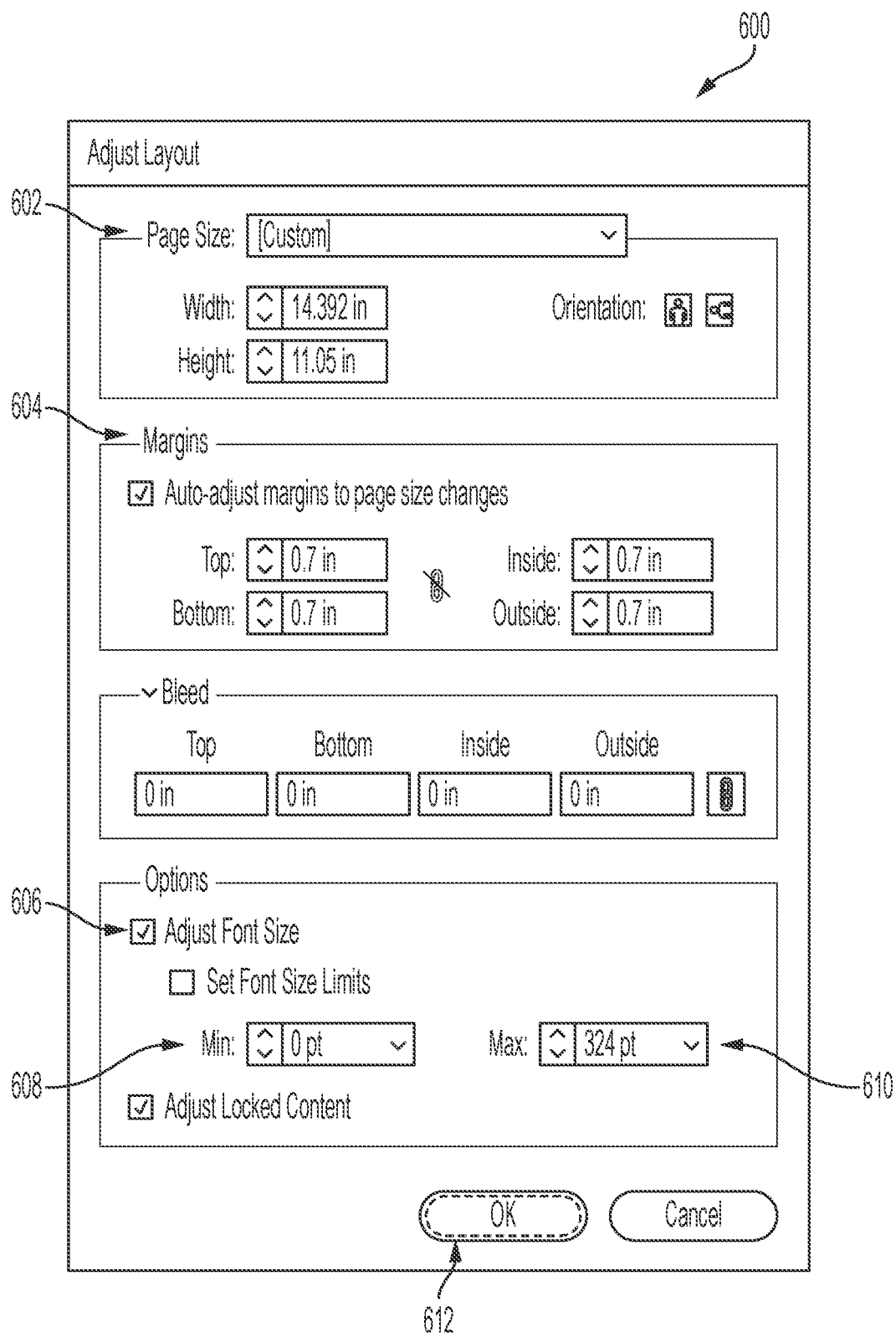
FIG. 6 depicts an example of a user interface used to initiate generation of the document with resized text, according to certain embodiments of the present disclosure.

FIG. 6 depicts an example of a user interface 600 used to initiate generation of the document 114 with the new layout from the original document 112 and the layout changes 118, according to certain embodiments. In an example, the user interface 600 is presented to a user within the document editor 102. The user interface 600 provides the user with the ability to generate the layout changes 118 to the original document 112 by changing a page size 602, the page margins 604, or both. Other layout changes 118 not shown in the user interface 600 (e.g., orientation changes) may also be provided to the user in other user interfaces.

Also included in the user interface 600 is an adjust font size selector 606. By selecting the adjust font size selector 606, the document editor automatically generates the resized font document 104 based on the original document 112 and the layout changes 118 provided within the user interface 600. As part of the adjust font size selector 606, a user is also able to set font size limits such as font size minimums 608 and font size maximums 610. The font size limits prevent the text of the resized text frames 116 from automatically resizing to an unreadable font size in either the large font or small font directions. After changing the page size 602, the margins 604, or making any other layout changes 118 and selecting the adjust font size selector 606, the user is able to select an "OK" selector 612 to generate the resized font document 104.

Figure 7:
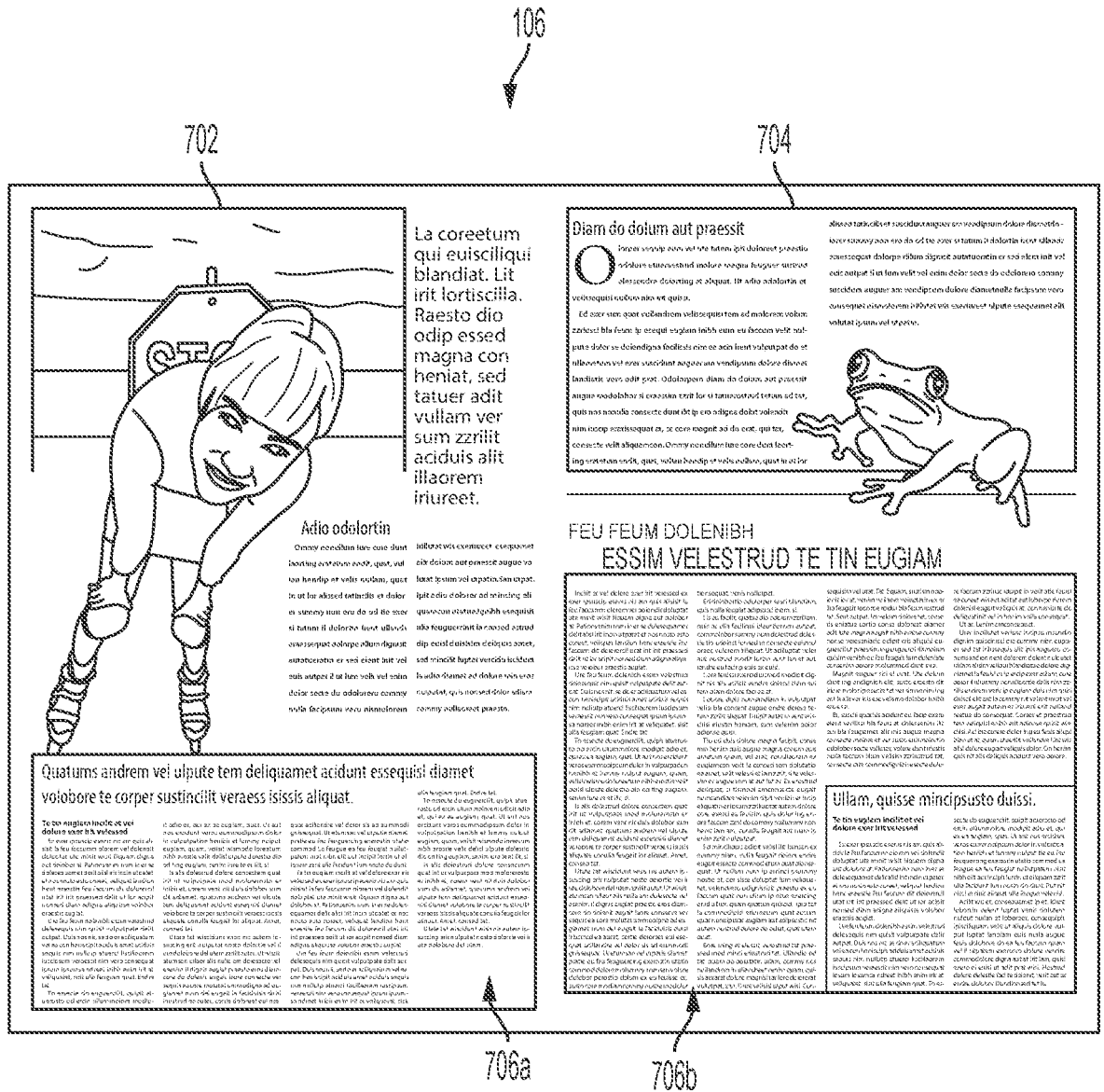
FIG. 7 depicts an example of a document with multiple pages and threaded text frames, according to certain embodiments of the present disclosure.

FIG. 7 depicts an example of an original document 112 with multiple pages 702 and 704, according to certain embodiments. The pages 702 and 704 also include threaded text frames 706a and 706b, respectively. In an example, a threaded text frame may refer to a text frame that is linked to one or more text frames located on different pages of the document such that the text frames share formatting characteristics. The threaded text frames 706a and 706b represent text frames that span multiple pages. In an example, the text of the threaded text frames 706a and 706b are resized together with the same font resizing factor when the document 114 with the new layout is generated. For example, the threaded text frames 706a and 706b may include the same font resizing factor when the document 114 with the new layout is generated. In one or more examples, the threaded text frames 706a and 706b may be part of a continuing story or an article that continues on subsequent pages.

In an example where a user modifies margins, modifies the page size, or performs other layout changes 118 on the first page 702 of the original document 112, the font size of all of the threaded text frames 706 within the document 114 with the new layout will resize together. In one or more examples where a user performs the layout changes 118 to a page of the original document 112 subsequent to the first page 702 (e.g., the second page 704), the font size may only change on the modified page.

Figure 8:
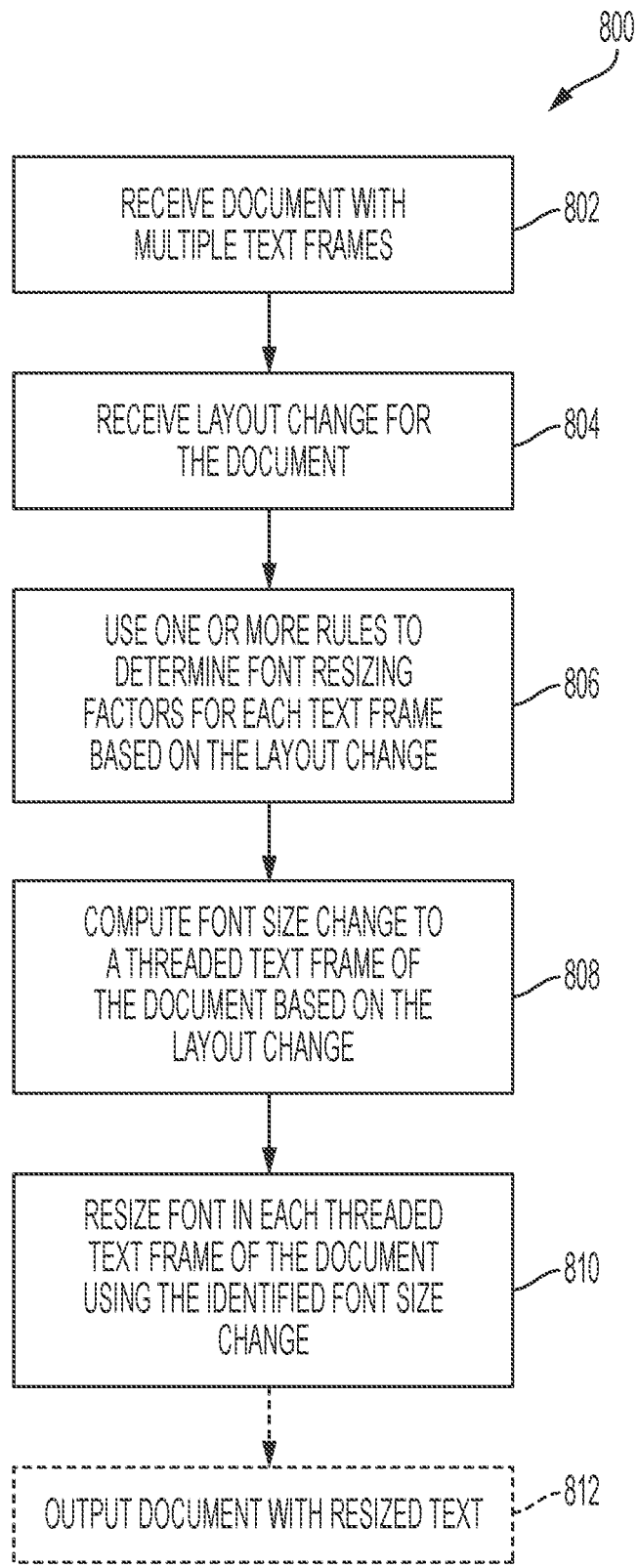
FIG. 8 depicts an example of a process for generating a document with resized text using the document editor of FIG. 1 and a document with threaded text frames, according to certain embodiments of the present disclosure.

FIG. 8 depicts an example of a process 800 for generating a document 114 with the new layout using the document editor 102 and an original document 112 with threaded text frames 706, according to certain embodiments. One or more computing devices (e.g., the computer system 100) implement operations depicted in FIG. 8 by executing suitable program code. For illustrative purposes, the process 800 is described with reference to certain examples depicted in the figures. Other implementations, however, are possible.

The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 800 presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in blocks 802-812 in FIG. 8 is performed by the font resizing subsystem 110 depicted in FIG. 1 or other aspects of the document editor 102.

At block 802, the process 800 involves receiving the original document 112 with one or more text frames 108 at the document editor 102. For instance, a user may provide the original document 112 to the document editor 102. The user may identify a document to be used as the original document 112, and the document editor 102 accesses the identified document from a memory location where the document is stored. At block 802, a single original document 112 may be received or multiple original documents 112 may be received.

At block 804, the process 800 involves receiving the layout changes 118 for the original document 112. The layout changes 118 may include an adjustment of margin sizes, an adjustment of a height and width of a document, an adjustment of an orientation (e.g., transitioning from portrait orientation to landscape orientation) of a document, any other layout changes, or any combination thereof. A user may provide an indication of the layout changes 118 manually through a user interface, such as the user interface 600 of FIG. 6, or the layout changes 118 may be automatically generated based on a size of a display to which the document 114 with the new layout will be displayed.

At block 806, the process 800 involves using one or more rules to determine font resizing factors for each text frame 108 of the original document 112 based on the layout changes 118. Four rules that govern the font resizing processing are described above with respect to FIG. 1. In certain embodiments, all of the four rules are used in combination to guide the automated font resizing processing. In another embodiment, different combinations of the rules, where a combination may not include one or more of the rules, may be used to guide the automated font resizing processing. Further, a location of the text frames 108 from the original document 112 (e.g., bottom of the frame, top of the frame, middle of the frame, etc.) is generally maintained by the resized text frames 116 of the document 114 with the new layout.

At block 808, the process 200 involves computing a font size change to threaded text frames (e.g., threaded text frames 706a and 706b) of the original document 112 based on the font resizing factors. An individual multiplier is computed from a set of font resizing factors associated with the threaded text frames and is applied to the threaded text within the threaded text frames. Accordingly, the font sizes of the text in the threaded text frames are multiplied by the individual multiplier (i.e., an individual font resizing factor) to determine the resized fonts for the text across all of the threaded text frames of the document 114 with the new layout. In an example, if a layout change causes text in a first threaded text frame to be resized by a certain amount, then the text in the other threaded text frames is resized by the same amount.

At block 810, the process 800 involves resizing the font size of the text in each of the resized threaded text frames using the font size change determined at block 808. The resized threaded text frames are used to generate the document 114 with the new layout, which may include other resized text frames 116 in addition to the resized threaded text frames. The document 114 with the new layout is generated to correspond with the layout changes 118 received by the font resizing subsystem 110.

At block 812, the process 800 may involve outputting the document 114 with the new layout to a display. In some examples, the document 114 with the new layout is output with a layout (e.g., document size) that matches a display size of the display. For example, a layout of the document 114 with the new layout is altered based on the size of the display that is being used to display the document 114 with the new layout. In another example, the process 800 may involve printing the document 114 with the new layout on a print medium with a size that matches the layout of the document 114 with the new layout.

Figure 9:
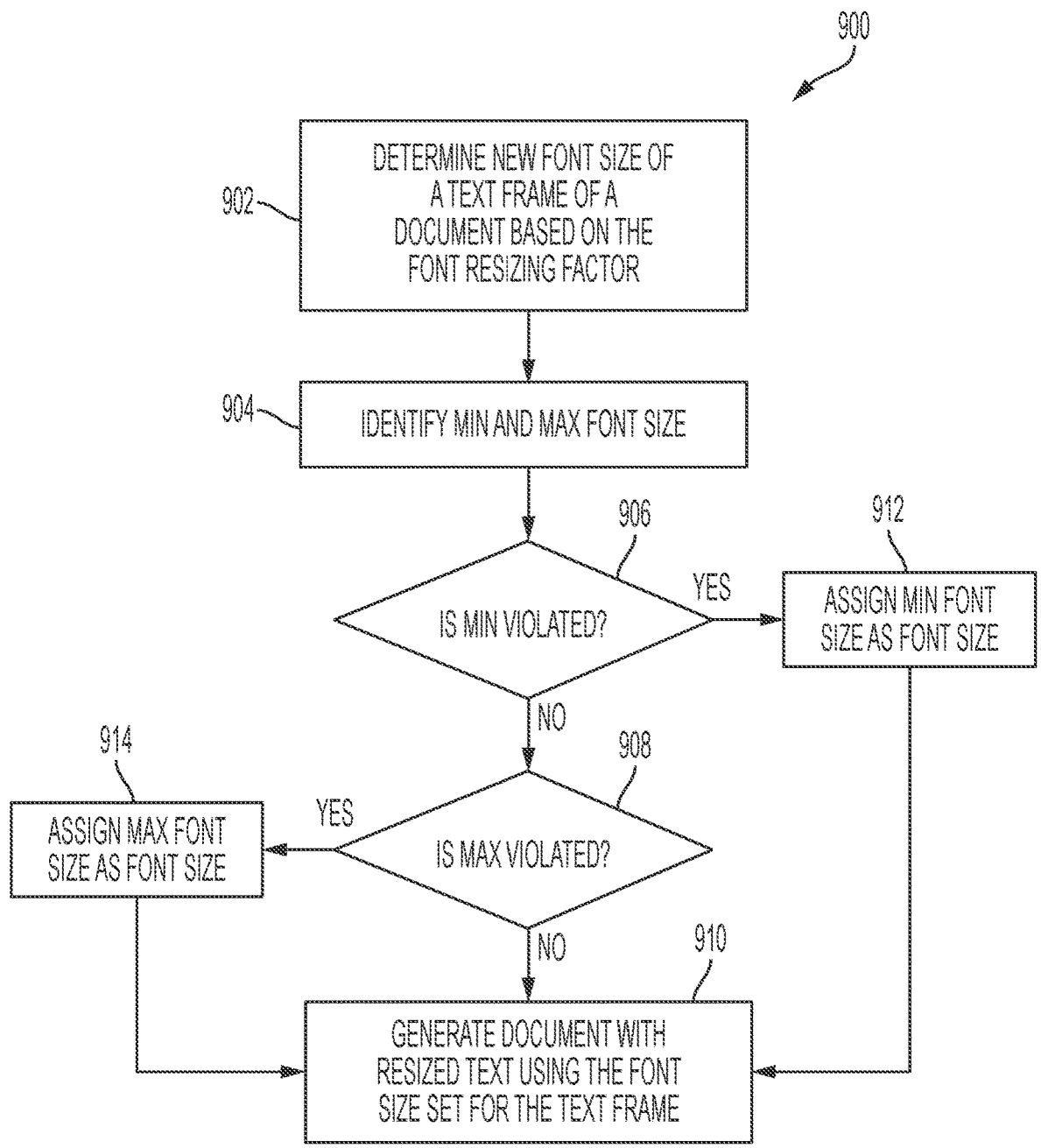
FIG. 9 depicts an example of a process for generating a document with resized text according to font size minimum and font size maximum text sizes, according to certain embodiments of the present disclosure.

FIG. 9 depicts an example of a process 900 for generating a document 114 with the new layout according to font size minimums 608 and font size maximums 610, according to certain embodiments. When the font size minimums 608, font size maximums 610, or both are set in the user interface 600, the resized text in the resized text frames 116 of the document 114 with the new layout may be limited to font sizes that exceed the font size minimums 608 and are less than the font size maximums. One or more computing devices (e.g., the computer system 100) implement operations depicted in FIG. 9 by executing suitable program code. For illustrative purposes, the process 900 is described with reference to certain examples depicted in the figures. Other implementations, however, are possible. The following table illustrates the logic described in the process 900:

TABLE 2

| Value of Y against L1 and L2 | New font size applied |
|---|---|
| L1 < Y < L2 | Y |
| Y <= L1 | L1 |
| Y >= L2 | L2 |

For example, L1 represents a font size minimum 608, L2 represents a font size maximum 610, and Y represents a computed font size for the resized text in a text frame 116. As illustrated, when the computed font size Y is a value between the font size minimum 608 and the font size maximum 610, the computed font size Y is applied to the resized text in the text frame 116. When the computed font size Y is a value less than or equal to font size minimum 608 (i.e., the computed font size Y violates the font size minimum 608), then the font size of the font size minimum 608 is applied to the resized text in the text frame 116. When the computed font size Y is a value greater than or equal to the font size maximum 610 (i.e., the computed font size Y violates the font size maximum 610), then the font size of the font size maximum 610 is applied to the resized text in the text frame 116. It may be appreciated that, in some embodiments, the font size minimum 608, the font size maximum 610, or both may not be established, and the computed font size Y will always be used in place of the font size minimum 608, the font size maximum 610, or both that has not been established.

The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 900 presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in blocks 902-914 in FIG. 9 is performed by the font resizing subsystem 110 depicted in FIG. 1 or other aspects of the document editor 102.

At block 902, the process 900 involves determining new font sizes for a text frames 108 of the original document 112 based on a font resizing factor. The font resizing factor for the text frame may be represented as a multiplier. Accordingly, the font size of the text frame 108 is multiplied by its font resizing factor to determine a resized font for the text in the resized text frame 116 of the document 114 with resized text.

At block 904, the process 900 involves identifying the font size minimum 608 and the font size maximum 610 of the document 114. As discussed above with respect to FIG. 6, a user is able to set the font size minimum 608 and the font size maximum 610 within the user interface 600. In one or more examples, the font size minimum 608 and the font size maximum 610 may be established as default values or not established at all. In an instance where the font size minimum 608 and the font size maximum 610 is not established, the process 900 may end when a determination that no font size minimum 608 or font size maximum 610 exists at block 904.

At block 906, the process 900 involves making a determination as to whether the determined font size change for the text frames 108 violates the font size minimum 608 (e.g., whether the font size change results in text that is smaller than the font size minimum 608). If the font size minimum 608 is not violated for a text frame 108, a determination is made at block 908 as to whether the determined font size change for the text frame 108 violates the font size maximum 610 (e.g., whether the font size change results in text that is larger than the font size maximum 610). If the font size maximum 610 is not violated, at block 910 the process involves generating the document 114 with resized text using the font size determined at block 902 for the text frame of the document 114.

If, at block 906, the font size minimum 608 is violated (i.e., the new font size is less than the font size minimum 608), at block 912, the process 900 involves assigning a minimum font size (e.g., the font size of the font size minimum 608) as the font size for the violating text frame 108. Accordingly, at block 910, the process 900 involves generating the document 114 using the minimum font size for the violating text frame 108.

If, at block 908, the font size maximum 610 is violated (i.e., the new font sizes are greater than the font size maximums 610), at block 914, the process 900 involves assigning a maximum font size (e.g., the font size of the font size maximum 610) as the font size for the violating text frame 108. Accordingly, at block 910, the process 900 involves generating the document 114 with the new layout using the maximum font size for the violating text frame 108. The process 900 may be applied for each new font size calculated for each text frame.

Examples of a Computing Environments for Implementing Certain Embodiments

Figure 10:
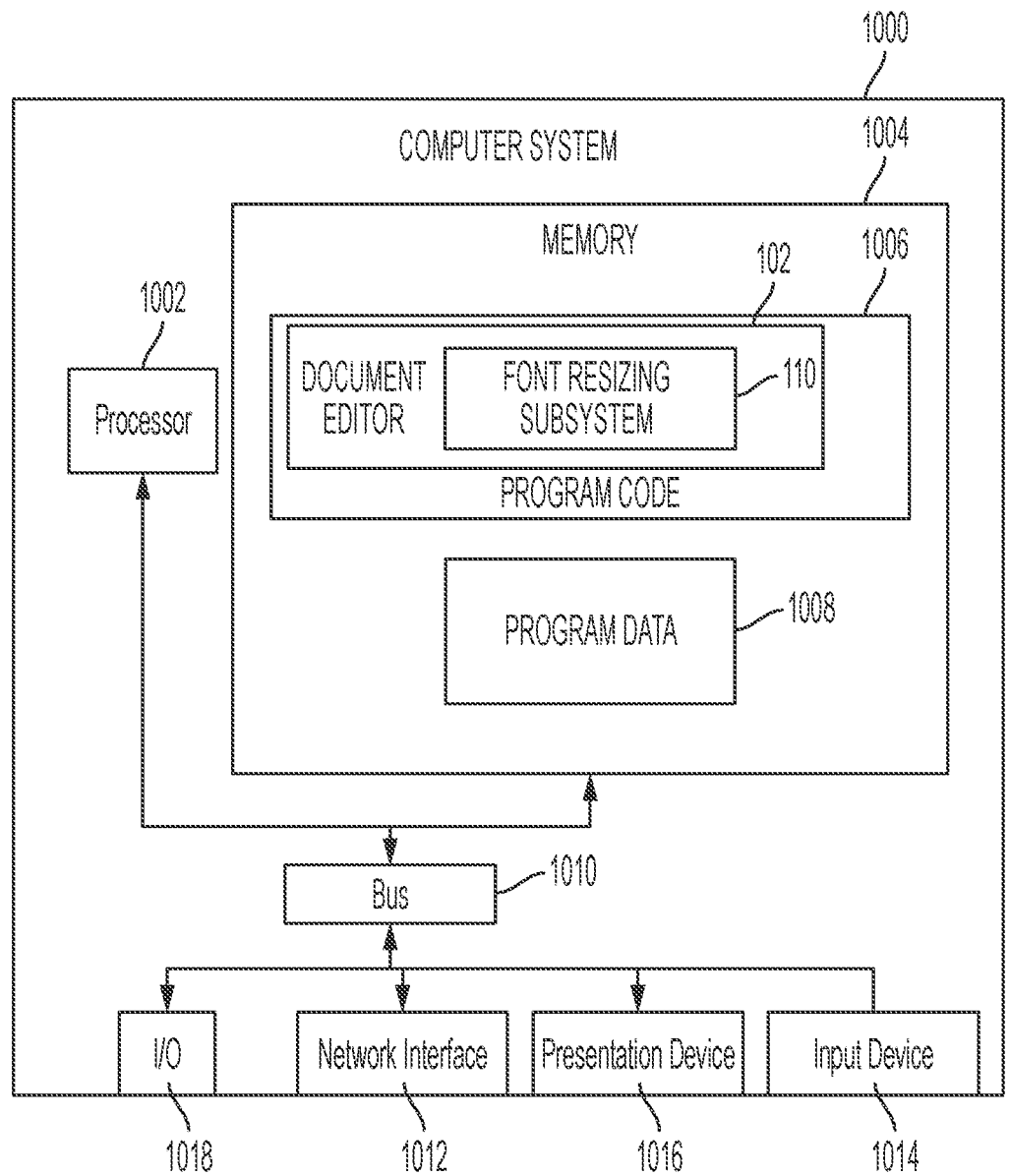
FIG. 10 depicts an example of a computing system for implementing certain embodiments of the present disclosure.

Any suitable computing system or group of computing systems can be used for performing the operations described herein. For example, FIG. 10 depicts an example of a computing system 1000. The computing system 1000 implements the document editor 102 and the font resizing subsystem 110. In an embodiment, a computing system 1000 having devices similar to those depicted in FIG. 10 (e.g., a processor, a memory, etc.) combines the one or more operations and data stores that may be operated as separate subsystems.

The depicted example of the computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

The memory device 1004 includes any suitable non-transitory computer-readable medium for storing program code 1006, program data 1008, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1004 can be volatile memory, non-volatile memory, or a combination thereof.

The computing system 1000 executes program code 1006 that configures the processor 1002 to perform one or more of the operations described herein. Examples of the program code 1006 include, in various embodiments, the document editor 102, which may include the font resizing subsystem 104, or any other suitable systems or subsystems that perform one or more operations described herein (e.g., one or more development systems for configuring an interactive user interface). The program code 1006 may be resident in the memory device 1004 or any suitable computer-readable medium and may be executed by the processor 1002 or any other suitable processor.

The processor 1002 is an integrated circuit device that can execute the program code 1006. The program code 1006 can be for executing an operating system, an application system or subsystem (e.g., the document editor 102 or the font resizing subsystem 110), or both. When executed by the processor 1002, the instructions cause the processor 1002 to perform operations of the program code 1006. When being executed by the processor 1002, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 1004 store the program data 1008 that includes one or more datasets and models described herein. Examples of these datasets include document data, layout change information, text data, etc. In some embodiments, one or more of data sets, models, and functions are stored in the same memory device (e.g., one of the memory devices 1004). In additional or alternative embodiments, one or more of the programs, data sets, models, and functions described herein are stored in different memory devices 1004 accessible via a data network. One or more buses 1010 are also included in the computing system 1000. The buses 1010 communicatively couple one or more components of a respective one of the computing system 1000.

In some embodiments, the computing system 1000 also includes a network interface device 1012. The network interface device 1012 includes any device or group of devices suitable for establishing a wired or wireless data connection to one or more data networks. Non-limiting examples of the network interface device 1012 include an Ethernet network adapter, a modem, and/or the like. The computing system 1000 is able to communicate with one or more other computing devices via a data network using the network interface device 1012.

The computing system 1000 may also include a number of external or internal devices, an input device 1014, a presentation device 1016, or other input or output devices. For example, the computing system 1000 is shown with one or more input/output ("I/O") interfaces 1018. An I/O interface 1018 can receive input from input devices or provide output to output devices. An input device 1014 can include any device or group of devices suitable for receiving visual, auditory, or other suitable input that controls or affects the operations of the processor 1002. Non-limiting examples of the input device 1014 include a touchscreen, a mouse, a keyboard, a microphone, a separate mobile computing device, etc. A presentation device 1016 can include any device or group of devices suitable for providing visual, auditory, or other suitable sensory output. Non-limiting examples of the presentation device 1016 include a touchscreen, a monitor, a speaker, a separate mobile computing device, etc.

Although FIG. 10 depicts the input device 1014 and the presentation device 1016 as being local to the computing device that executes the document editor 102, other implementations are possible. For instance, in some embodiments, one or more of the input device 1014 and the presentation device 1016 can include a remote client-computing device that communicates with the document editor 102 via the network interface device 1012 using one or more data networks described herein.

Figure 11:
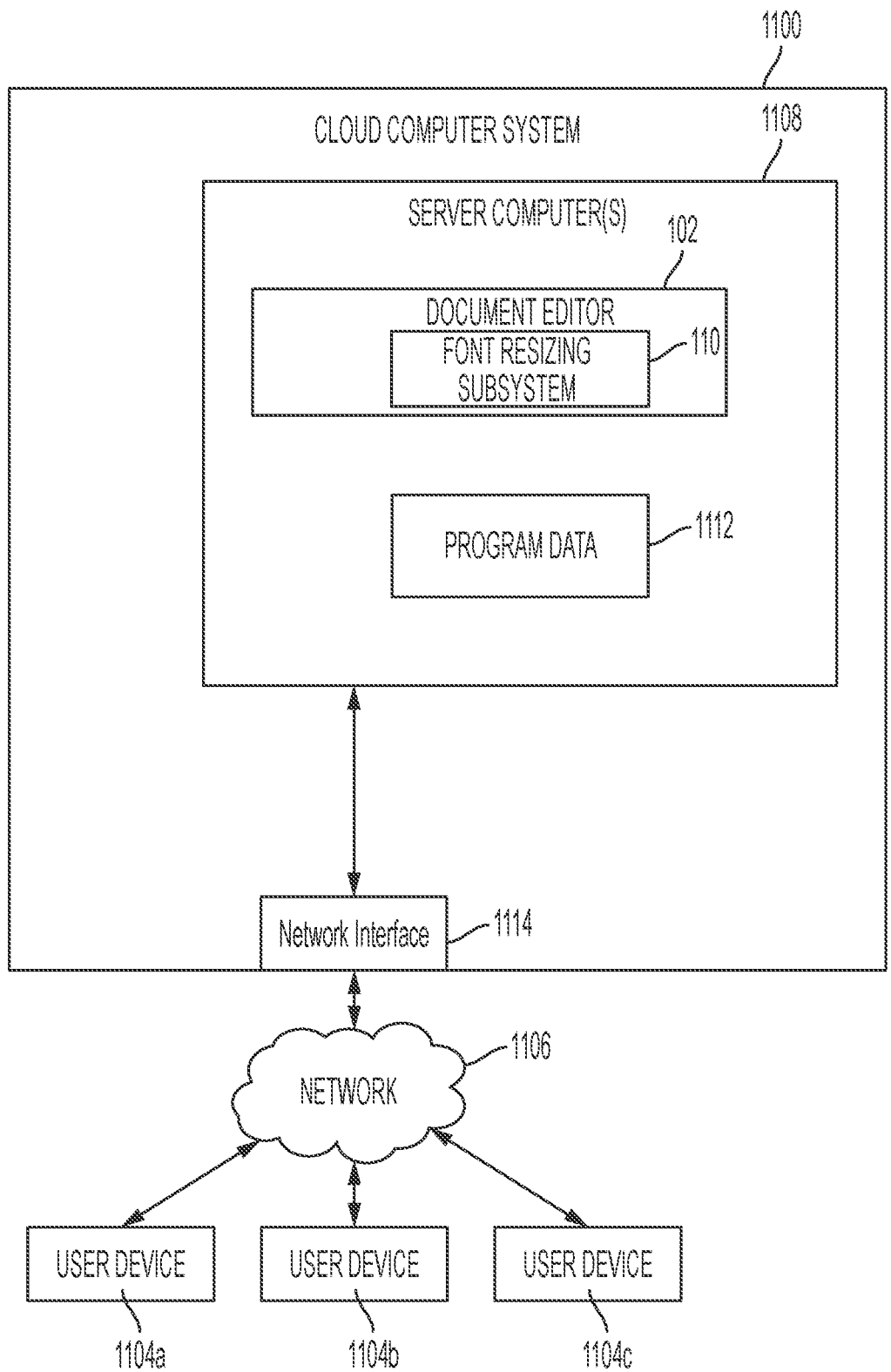
FIG. 11 depicts an example of a cloud computing system for implementing certain embodiments of the present disclosure.

In some embodiments, the functionality provided by the document editor may be offered as cloud services by a cloud service provider. For example, FIG. 11 depicts an example of a cloud computing system 1100 offering a document editing service that can be used by a number of user subscribers using user devices 1104*a*, 1104*b*, and 1104*c* across a data network 1106. In the example, the document editing service may be offered under a Software as a Service (SaaS) model. One or more users may subscribe to the document editing service, and the cloud computing system 1100 performs the processing to provide the document editing service to subscribers. The cloud computing system 1100 may include one or more remote server computers 1108.

The remote server computers 1108 include any suitable non-transitory computer-readable medium for storing program code 1110 (e.g., the document editor 102) and program data 1112, or both, which is used by the cloud computing system 1100 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1108 can include volatile memory, non-volatile memory, or a combination thereof.

One or more of the servers 1108 execute the program code 1110 that configures one or more processors of the server computers 1108 to perform one or more of the operations that provide document editing services, including the ability to generate documents with resized text based upon layout changes of one or more original documents provided by one or more subscribers. As depicted in the embodiment in FIG. 11, the one or more servers providing the services to generate documents with resized text may implement a font resizing subsystem 110. Any other suitable systems or subsystems that perform one or more operations described herein (e.g., one or more development systems for configuring an interactive user interface) can also be implemented by the cloud computing system 1100.

In certain embodiments, the cloud computing system 1100 may implement the services by executing program code and/or using program data 1112, which may be resident in a memory device of the server computers 1108 or any suitable computer-readable medium and may be executed by the processors of the server computers 1108 or any other suitable processor.

In some embodiments, the program data 1112 includes one or more datasets and models described herein. Examples of these datasets include document arrangement data, text size data, layout change data, etc. In some embodiments, one or more of data sets, models, and functions are stored in the same memory device. In additional or alternative embodiments, one or more of the programs, data sets, models, and functions described herein are stored in different memory devices accessible via the data network 1106.

The cloud computing system 1100 also includes a network interface device 1114 that enable communications to and from cloud computing system 1100. In certain embodiments, the network interface device 1114 includes any device or group of devices suitable for establishing a wired or wireless data connection to the data networks 1106. Non-limiting examples of the network interface device 1114 include an Ethernet network adapter, a modem, and/or the like. The document editor 1102 is able to communicate with the user devices 1104*a*, 1104*b*, and 1104*c* via the data network 1106 using the network interface device 1114.

General Considerations

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method in which one or more processing devices perform operations comprising:
   receiving, by a document editor, information indicating a layout change for an original document comprising a set of one or more text frames, the set of text frames including a first text frame, the first text frame comprising first text content in a first font size, the layout change causing a change in a size of the first text frame to a resized first text frame;
   determining, by the document editor, a second font size for the first text content for the resized first text frame, wherein determining the second font size comprises:
      determining a particular percentage of area of the first text frame covered by the first text content in the first font size;
      determining the second font size such that a percentage of area in the resized first text frame covered by the first text content in the second font size is similar to the particular percentage of area of the first text frame covered by the first text content in the first font size;
   resizing, by the document editor, a size of the first text content from the first font size to the second font size; and
   outputting, by the document editor on a display, a document with the resized first text frame displaying the first text content in the second font size.

2. The method of claim 1, wherein the layout change comprises a change in a size of the original document, a change in a margin of the original document, the change in the size of the first text frame, a change in an arrangement of content in the original document, or any combination thereof.

3. The method of claim 1, wherein the document editor provides a user selectable option for generating the document with the resized first text frame.

4. The method of claim 1, wherein determining the second font size comprises:
   determining, by the document editor, a font resize factor for resizing the first text content for the resized first text frame; and
   determining, by the document editor, the second font size based upon the font resize factor and the first font size.

5. The method of claim 1, wherein a total number of font sizes in the document with the resized first text frame is the same as a total number of font sizes in the original document.

6. The method of claim 1, wherein the set of text frames of the original document comprises a second text frame comprising a second text content in a third font size, and further comprising:
   upon determining that the third font size is the same as the first font size, outputting, by the document editor, the second text content in a resized second text frame in the second font size.

7. The method of claim 1, wherein determining the second font size further comprises:
   determining, by the document editor, a first font resize factor for the first text frame;
   determining, by the document editor, a second font resize factor for a second text frame;
   comparing, by the document editor, the first font resize factor to the second font resize factor; and
   assigning, by the document editor based on the comparing, a smaller of the first font resize factor and the second font resize factor as a common font resize factor; and
   wherein the second font size is determined based on the common font resize factor and the first font size.

8. The method of claim 1, wherein the original document comprises a plurality of pages, wherein the first text frame is threaded with a second text frame on another page of the plurality of pages, and wherein resizing the size of the first text content of the first text frame with a font resizing factor comprises resizing second text content of the second text frame with the font resizing factor.

9. The method of claim 1, wherein determining the second font size comprises:
- determining, by the document editor, a font resize factor for resizing the first text content for the resized first text frame;
- determining, by the document editor, a third font size based upon the font resize factor and the first font size; and
- responsive to determining that the third font size is less than a minimum font size limit value configured for the document with the resized first text frame, setting, by the document editor, the minimum font size limit value as the second font size.

10. The method of claim 1, wherein determining the second font size comprises:
- determining, by the document editor, a font resize factor for resizing the first text content for the resized first text frame;
- determining, by the document editor, a third font size based upon the font resize factor and the first font size; and
- responsive to determining that the third font size is greater than a maximum font size limit value configured for the document with the resized first text frame, setting, by the document editor, the maximum font size limit value as the second font size.

11. The method of claim 1, wherein the set of text frames comprises a second text frame comprising a second set of text with a third font size, and wherein the document with the resized first text frame comprises a resized second text frame comprising the second set of text with a fourth font size different from the second font size.

12. A computing system comprising:
- one or more processors configured to perform processing comprising:
  - receiving information indicating a layout change for an original document comprising a set of one or more text frames, the set of text frames including a first text frame, the first text frame comprising first text content in a first font size, the layout change causing a change in a size of the first text frame to a resized first text frame;
  - determining a font resize factor for resizing the first text content for the resized first text frame;
  - determining a second font size for the first text content for the resized first text frame, wherein determining the second font size comprises:
    - determining a particular percentage of area of the first text frame covered by the first text content in the first font size;
    - determining the second font size such that a percentage of area in the resized first text frame covered by the first text content in the second font size is similar to the particular percentage of area of the first text frame covered by the first text content in the first font size;
  - resizing a size of the first text content from the first font size to the second font size; and
  - displaying a document with the resized first text frame displaying the first text content in the second font size.

13. The computing system of claim 12, wherein the set of text frames of the original document comprises a second text frame comprising a second text content in a third font size, the processing further comprising:
- upon determining that the third font size is the same as the first font size, outputting, the second text content in a resized second text frame in the second font size.

14. The computing system of claim 12, wherein the set of text frames comprises a second text frame comprising a second set of text with a third font size, and wherein the document with the resized first text frame comprises a resized second text frame comprising the second set of text with a fourth font size different from the second font size.

15. The computing system of claim 12, wherein the layout change comprises a change in a size of the original document, a change in a margin of the original document, the change in the size of the first text frame, a change in an arrangement of content in the original document, or any combination thereof.

16. The computing system of claim 12, wherein a total number of font sizes in the document with the resized first text frame is the same as a total number of font sizes in the original document.

17. A non-transitory computer-readable medium having program code that is stored thereon, the program code executable by one or more processing devices for performing operations comprising:
- receiving information indicating a layout change for an original document comprising a set of one or more text frames, the set of text frames including a first text frame, the first text frame comprising first text content in a first font size, the layout change causing a change in a size of the first text frame to a resized first text frame;
- determining a second font size for the first text content for the resized first text frame, wherein determining the second font size comprises:
  - determining a particular percentage of area of the first text frame covered by the first text content in the first font size;
  - determining the second font size such that a percentage of area in the resized first text frame covered by the first text content in the second font size is similar to the particular percentage of area of the first text frame covered by the first text content in the first font size;
- resizing a size of the first text content from the first font size to the second font size; and
- outputting a document with the resized first text frame displaying the first text content in the second font size.

18. The non-transitory computer-readable medium of claim 17, wherein performing operations comprising determining the second font size further comprises:
- determining a font resize factor for resizing the first text content for the resized first text frame;
- determining a third font size based upon the font resize factor and the first font size; and
- responsive to determining that the third font size is less than a minimum font size limit value configured for the document with the resized first text frame, setting the minimum font size limit value as the second font size.

19. The non-transitory computer-readable medium of claim 17, wherein performing operations comprising determining the second font size comprises:
- determining a font resize factor for resizing the first text content for the resized first text frame;
- determining a third font size based upon the font resize factor and the first font size; and
- responsive to determining that the third font size is greater than a maximum font size limit value configured for the document with the resized first text frame, setting the maximum font size limit value as the second font size.

20. The non-transitory computer-readable medium of claim 17, wherein the layout change comprises a change in a size of the original document, a change in a margin of the original document, the change in the size of the first text frame, a change in an arrangement of content in the original document, or any combination thereof.

* * * * *